United States Patent Office 3,509,166
Patented Apr. 28, 1970

3,509,166
TETRAHYDRO-PYRIDINE DERIVATIVES OF BENZAMIDE
William Blythe Wright, Jr., Woodcliff Lake, N.J., and Herbert Joseph Brabander, Nanuet, N.Y., assignors to American Cyanamid Company, Stamford, Conn., a corporation of Maine
No Drawing. Continuation-in-part of application Ser. No. 596,810, Nov. 25, 1966. This application Jan. 15, 1968, Ser. No. 697,580
Int. Cl. C07d 29/38
U.S. Cl. 260—295          7 Claims

ABSTRACT OF THE DISCLOSURE

The preparation of substituted N-(tert.-aminoalkyl)-benzamide compounds by reacting a halogen, lower alkylsulfonyloxy or monocyclic arylsulfonyloxy substituted alkylene substituted benzamide with various arylheterocyclic compounds, is described. Other methods of preparing substituted N-(tert.-aminoalkyl)benzamides are described. The substituted N-(tert.-aminoalkyl)benzamides are useful for their central nervous system (CNS) depressant properties.

---

This application is a continuation-in-part of our application Ser. No. 596,810, filed Nov. 25, 1966, now abandoned.

SUMMARY OF THE INVENTION

This invention relates to new organic compounds. More particularly, it relates to N-(tert.-aminoalkyl)benzamide derivatives and methods of preparing the same.

The novel compounds of the present invention may be illustrated by the following formula:

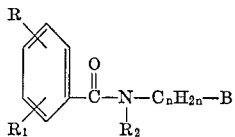

wherein R and $R_1$ are selected from the group consisting of hydrogen, lower alkyl, halogen and trifluoromethyl; $R_2$ is selected from the group consisting of hydrogen, lower alkyl, and lower alkenyl; $n$ is an integer from 2 to 4; B is selected from the group consisting of 4-aryl-3,6-dihydro-1(2H)-pyridyl and 4-arylpiperidino, in which aryl is selected from the group consisting of phenyl, halophenyl, lower alkylphenyl, lower alkoxyphenyl, lower akylthiophenyl and trifluoromethylphenyl; and non-toxic acid addition salts thereof.

The free bases of this invention, in general, may be either liquids or solids at room temperature. The free bases are, in general, relatively insoluble in water, but soluble in most organic solvents such as lower alkyl alcohols and esters, acetone, chloroform, and the like. These compounds form acid addition salts with strong acids, such as hydrochloric acid, sulfuric acid, perchloric acid, and the like. The compounds also form salts with organic acids, as for example, fumaric and maleic acid. Such salts in general, are soluble in water, methanol and ethanol, but relatively insoluble in benzene, ether, petroleum ether, and the like.

The compounds of this invention may be prepared by the following method which is the preferred method.

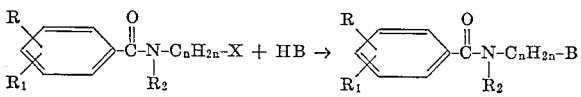

wherein R, $R_1$, $R_2$, B and $n$ are as defined above and X is halogen, lower alkylsulfonyloxy or monocyclic arylsulfonyloxy. The reaction takes place when the reagents are contacted in an inert solvent such as ether, tetrahydrofuran, toluene, benzene and the like, and the reagent mixture is maintained within the temperature range of from about 50° C. to 150° C. for a period of 10 minutes to several hours.

The compounds of the present invention can also be prepared by other methods. One of these involves the reaction of a benzoyl halide with a reactive diamine derivative and is illustrated as follows:

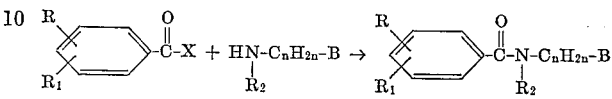

wherein R, $R_1$, $R_2$, $n$ and B are as defined above and X is halogen.

In this process, the benzoyl halide is treated with an alkylenediamine derivative, usually at room temperature and in an inert solvent, and the product is isolated by procedures well known to the art.

Another method of preparing the present compounds involves the preparation of a reactive benzamide derivative as an intermediate followed by reaction with an alkylene diamine:

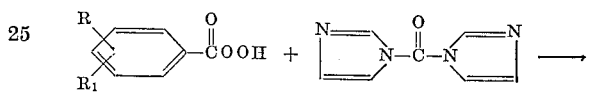

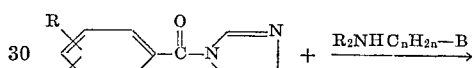

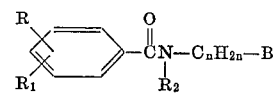

wherein R, $R_1$, $R_2$, $n$ and B are as hereinbefore defined. This reaction is best carried out in two steps and tetrahydrofuran is a useful solvent. A temperature range of 25–75° C. is most desirable in carrying out the reaction.

A still further method can be used wherein an acid and an alkylene diamine are mixed and a carbodiimide derivative is added to effect condensation.

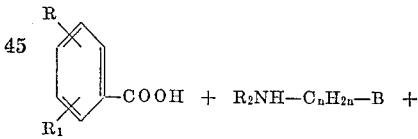

wherein R, $R_1$, $R_2$, $n$ and B are as defined above.

This reaction may usually be carried out within a temperature range of 25–100° C. and the product is isolated by procedures well known to the art.

Benzamides may also be used as intermediates for alkylation procedures:

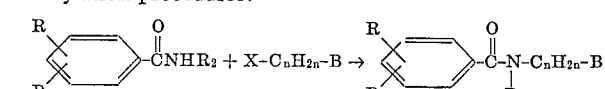

wherein R, $R_1$ $R_2$, B and $n$ are as defined hereinbefore and X is a reactive halogen, lower alkyl sulfonyloxy or monocyclic arylsulfonyloxy group. The amide is dissolved in an inert solvent, as for example, diethyleneglycol dimethyl ether (diglyme) and reacted with a condensing agent such as sodium hydride and then with an appropriate aminoalkyl derivative. The reaction may be best carried out at temperatures within the range of about 30°–200° C. for a period of from 30 minutes to 6 hours.

The compounds of the present invention show central nervous system (CNS) depressant properties when used in warm-blooded animals. This activity is indicated by several procedures. For example, a test which indicates hypnotic and/or muscle relaxant type activity is represented by the following rod walking test. Groups of 6 mice each are tested for their ability to walk across a horizontal rod in a normal manner after receiving graded interperitoneal doses of a compound. A median effective rod walking dose (RWD) is estimated.

A test which indicates tranquilizing activity is represented by a measure of the reduction in motor activity. One-half of the (RWD) dose is given to a group of 5 mice and a 5 minute count of motor activity is recorded (actophotometer). Counts of $\leqq 250$ are considered to indicate a specific reduction (more than two standard deviations) of activity at a dose causing only minimal impairment of neurological function as measured by rod walking ability. Compounds that appeared to reduce motor activity ($\leqq 250$ count) are administered to additional groups of 5 mice at graded doses and tested similarly. The motor depression dose (MDD) which causes a 50% reduction of motor activity (a count of 250) is estimated. The use of reduced motor activity as a measure of tranquilizing activity has been described by W. D. Gray, A. C. Osterberg and C. E. Rauh, Archives Internationales et de Therapie, vol. 134, p. 198 (1961) and by W. J. Kinnard and C. J. Carr, Journal of Pharmacology and Experimental Therapeutics, vol 121, p. 354 (1957).

As a test for toxicity or margin of safety, the compounds that did specifically reduce motor activity are given to 10 mice at a dose of 10× MDD. The compounds that did not reduce motor activity are given to 10 mice at a dose of 4× RWD. If more than 50% of the mice die within 24 hours, the compound is rejected for reasons of toxicity or low margin of safety. If less than 50% of the mice die, the compound is considered interesting for further study.

The (CNS) activity of representative compounds when tested by the above procedure is summarized in the following table.

TABLE

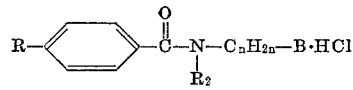

| R | $R_2$ | n | B | $MDD_{50}$[1] | $RWD_{50}$[1] | Safety, percent dead/dose[1] |
|---|---|---|---|---|---|---|
| H | H | 2 | N⟩–⟨phenyl | 2.4 | 16 | 50 at 56 |
| H | H | 2 | N⟩–⟨phenyl | 0.5 | 10 | 0 at 5 |
| H | H | 2 | N⟩–⟨phenyl–Cl | 14 | >100 | 0 at 140 |
| H | CH₃ | 2 | N⟩–⟨phenyl | 7.6 | 42 | 10 at 76 |
| F | H | 2 | N⟩–⟨phenyl | 5.6 | 26 | 0 at 56 |
| F | H | 2 | N⟩–⟨phenyl | 3.5 | 15 | 0 at 35 |
| F | H | 2 | N⟩–⟨phenyl–Cl | 10 | >100 | 0 at 100 |
| Cl | H | 2 | N⟩–⟨phenyl | 14 | >100 | 0 at 140 |
| H | H | 3 | N⟩–⟨phenyl | 1.8 | 32 | 0 at 18 |
| Cl | H | 3 | N⟩–⟨phenyl | 6.6 | 48 | 0 at 66 |

[1] Mg./kg.

The products of the present invention can be incorporated in various pharmaceutical forms such as tablets, capsules, pills, and so forth, for immediate or sustained release, by combining with suitable carriers. The daily dose may vary from 10 mg. to 1000 mg. dependent upon the warm-blooded animal. They may be in the form of dosage units for single therapeutic dose or in small units for multiple doses or in larger units for division into single doses. Obviously, in addition to the therapeutic compound there may be present excipients, binders, fillers and other therapeutically inert ingredients necessary in the formulation of the desired pharmaceutical preparation.

DETAILED DESCRIPTION

The following specific examples illustrate the preparation of representative compounds of the present invention. Parts are by weight unless otherwise indicated.

Example I.—Preparation of N-[2-(3,6-dihydro-4-phenyl-1(2H)-pyridyl)ethyl]benzamide A solution of 30.9 parts of benzoyl chloride in 300 parts of chloroform is added with cooling to a mixture of 64 parts of sodium carbonate and 41 parts of 2-bromoethylamine hydrobromide in 300 parts of water. The reaction mixture is stirred for 3 hours and the layers are separated. The aqueous layer is extracted with chloroform. The chloroform layers are combined and concentrated to remove the solvent. The residue is triturated with hexane and the product is filtered off and recrystallized from benzene. N-(2-bromoethyl)benzamide, melting point 96–98° C., is obtained.

A mixture of 4.6 parts of N-(2-bromoethyl)benzamide, 7.9 parts of 4-phenyl-1,2,5,6-tetrahydropyridine and 300 parts of benzene is heated at reflux temperature for 3 hours and cooled. Water and benzene are added and the layers are separated. The benzene layer is washed with water, dried over magnesium sulfate and concentrated to remove the solvent. The residue is triturated with hexane and ether and the solid is filtered off and recrystallized from ethanol. The N-[2-(3,6-dihydro-4-phenyl-1(2H)-pyridyl)ethyl]benzamide melts at 163–165° C.

The hydrochloride salt, melting point 201–203° C. is obtained when the above compound is dissolved in ethanol and treated with ethanolic hydrogen chloride. It is recrystallized from ethanol.

Example II.—Preparation of N-[3-(3,6-dihydro-4-phenyl-1(2H)-pyridyl)propyl]benzamide This compound, melting point 86–89° C., is obtained when 3-bromopropylamine hydrobromide is substituted for 2-bromoethylamine hydrobromide in the procedure of Example I. The hydrochloride melts at 190–192° C.

Example III.—Preparation of N-[2-(4-p-chlorophenyl-3,6-dihydro-1(2H)-pyridyl)ethyl]benzamide This compound, melting point 175–177° C., is obtained when 4-(p-chlorophenyl)-1,2,5,6-tetrahydropyridine is substituted for 4-phenyl-1,2,5,6-tetrahydropyridine in the procedure of Example I.

Example IV.—Preparation of N-[2-(3,6-dihydro-4-phenyl-1(2H)-pyridyl)ethyl]-p-chlorobenzamide When p-chlorobenzoylchloride is substituted for benzoyl chloride in the procedure of Example I, this compound, melting point 184–186° C., is obtained. The hydrochloride salt melts at 240–242° C.

Example V.—Preparation of N-[3-(3,6-dihydro-4-phenyl-1(2H)-pyridyl)propyl]-p-chlorobenzamide If N-(3-bromopropyl) - p - chlorobenzamide, melting point 84–86° C., is treated with 4-phenyl-1,2,5,6-tetrahydropyridine by the procedure of Example I, the above compound, melting point 133–135° C., is obtained. The hydrochloride salt melts at 212–215° C.

Example VI.—Preparation of N-[2-(3,6-dihydro-4-phenyl-1(2H)-pyridyl)ethyl]-p-fluorobenzamide The above compound is obtained when p-fluorobenzoyl fluoride is substituted for benzoyl chloride in the procedure of Example I. The hydrochloride melts at 219–222° C.

Example VII.—Preparation of N - [2 - (3,6 - dihydro-4-phenyl - 1(2H)-pyridyl)ethyl] - 4 - fluoro-2-methylbenzamide This compound is obtained when 4-fluoro-2-methylbenzoyl chloride is substituted for benzoyl chloride in the procedure of Example I.

Example VIII.—Preparation of N-[2-(3,6-dihydro-4-phenyl-1(2H)-pyridyl)ethyl]-2,4-dichlorobenzamide When 2-4-dichlorobenzoyl chloride is substituted for benzoyl chloride in the procedure of Example I, the above compound is obtained.

Example IX.—Preparation of N-[2-3,6-dihydro-4-phenyl-1(2H)-pyridyl)ethyl]-m-bromobenzamide If m-bromobenzoyl chloride is substituted for benzoyl chloride in the procedure of Example I, this compound is obtained.

Example X.—Preparation of N-[2-(3,6-dihydro-4-phenyl-1(2H)-pyridyl)ethyl-p-methylbenzamide This compound is obtained when p-methylbenzoyl chloride is substituted for benzoyl chloride in the procedure of Example I.

Example XI.—Preparation of N-[2-(4 - p - chlorophenyl-3,6-dihydro - 1(2H) - pyridyl)ethyl]-p-fluorobenzamide hydrochloride When N-(2-bromoethyl)-p-fluorobenzamide is treated with 4-(p-chlorophenyl)-1,2,5,6-tetrahydropyridine by the procedure of Example I, the above compound, melting point 227–229° C. is obtained.

Example XII.—Preparation of N-[4-(3,6-dihydro-4-m-methoxyphenyl-1(2H)-pyridyl)-butyl]benzamide The above compound is obtained when N-(4-bromopropyl)benzamide is treated with 4-(m-methoxyphenyl)-1,2,5,6-tetrahydropyridine by the procedure of Example I.

Example XIII.—Preparation of N-[2-(3,6-dihydro-4-m-tolyl-1(2H)-pyridyl)ethyl]benzamide This compound is obtained when N-(2-bromoethyl)benzamide is treated with 4-(m-tolyl)-1,2,5,6-tetrahydropyridine by the procedure of Example I.

Example XIV.—Preparation of N-[2 - (3,6 - dihydro-4-m-trifluoromethylphenyl - 1(2H) - pyridyl)ethyl]benzamide When N-(2-bromoethyl)benzamide is treated with 4-(m - trifluoromethylphenyl)-1,2,5,6-tetrahydropyridine by the procedure of Example I, the above compound is obtained.

Example XV.—Preparation of N - [2 - (3,6-dihydro-4-m-trifluoromethylphenyl-1(2H)-pyridyl)ethyl]-p - fluorobenzamide The above compound is obtained when N-(2-bromoethyl)-p-fluorobenzamide is treated with 4-(m-trifluoromethylphenyl) - 1,2,5,6 - tetrahydropyridine by the procedure of Example I.

Example XVI.—Preparation of N-[2-(4-phenylpiperidino)ethyl]benzamide

If 4-phenylpiperidine is treated with N-(2-bromoethyl)-benzamide by the procedure of Example I, the above compound is obtained. The hydrochloride salt melts at 243–245° C.

Example XVII.—Preparation of N-[2-(4-m-trifluoromethylphenylpiperidino)ethyl]benzamide The above compound is obtained when N-(2-bromoethyl)benzamide is treated with 4-(m-trifluoromethylphenyl)piperidine by the procedure of Example I.

Example XVIII.—Preparation of N-[2-(4-o-chlorophenylpiperidino)ethyl]benzamide

When 4-(p-chlorophenyl)piperidine is substituted for 4-phenyl-1,2,5,6-tetrahydropyridine in the procedure of Example I, this compound is obtained.

Example XIX.—Preparation of N-[2-(4-phenylpiperidino)ethyl]-p-fluorobenzamide

The above compound is obtained when N-(2-bromoethyl)-p-fluorobenzamide is treated with 4-phenylpiperidine by the procedure of Example I. The hydrochloride salt melts at 236–238° C.

Example XX.—Preparation of N-[3-(4-m-tolyl-piperidino)propyl]benzamide

This compound is obtained when N-(3-bromopropyl) benzamide is treated with 4-(m-tolyl)piperidino by the procedure of Example I.

Example XXI.—Preparation of N-methyl-N-[2-(3,6-dihydro - 4 - phenyl - 1(2H) - pyridyl)ethyl]benzamide hydrochloride A mixture of 27 parts of 2-chloroethylmethylamine hydrochloride, 41 parts of sodium carbonate, 250 parts of water and 300 parts of ether is cooled and a solution of 25 parts of benzoyl chloride in 150 parts of ether is added. Stirring is continued at 25–30° C. for 2 hours and the layers are separated. The ether phase is washed with water, dried over magnesium sulfate and concentrated. The oily residue is distilled and N-(2-chloroethyl)-N-methylbenzamide is collected at 138–142° C./0.2 mm.

A mixture of 6.3 parts of N-(2-chloroethyl)-N-methylbenzamide, 10.2 parts of 4-phenyl - 1,2,5,6 - tetrahydropyridine and 150 parts of benzene is heated at reflux temperature for 10 hours. The reaction mixture is washed twice with water, dried over magnesium sulfate, and concentrated to remove the solvent. The residue is distilled and the portion boiling at 210–220° C./0.1 mm. is collected. This is dissolved in benzene and ethanolic hydrogen chloride and ether are added. The precipitate is filtered off and recrystallized from ethanol. The N-methyl-N-[2-(3,6-dihydro - 4 - phenyl-1(2H)-pyridyl)ethyl]benzamide hydrochloride melts at 213–216° C.

Example XXII.—Preparation of N - allyl - N - [2-(3,6-dihydro-4-phenyl-1(2H)-pyridyl)ethyl]benzamide The above compound is obtained when N-(2-chloroethyl)-N-allylbenzamide is substituted for N-(2-chloroethyl)-N-methylbenzamide in the procedure of Example XXI.

Example XXIII.—Preparation of N-[2-(3,6-dihydro-4-phenyl-1(2H)-pyridyl)ethyl]benzamide hydrochloride A mixture of 21 parts of 1-(2-aminoethyl)-4-phenyl-1,2,5,6-tetrahydropyridine, 30 parts of sodium carbonate, 200 parts of water and 400 parts of benzene is stirred and cooled and 14 parts of benzoyl chloride are added. The mixture is stirred for 5 hours. The layers are separated and the benzene layer is washed with water and then concentrated. The residue is recrystallized from benzene and hexane. N-[2-(3,4-dihydro-4-phenyl-1(2H)-pyridyl)ethyl]benzamide melts at 163–165° C.

Example XXIV.—Preparation of N-[2-(3,6-dihydro-4-phenyl - 1(2H) - pyridyl)ethyl]m - trifluoromethylbenzamide The above compound is obtained when m-trifluoromethylbenzoyl chloride is substituted for benzoyl chloride in the procedure of Example I.

Example XXV.—Preparation of N-[2-(3,6-dihydro-4-m-methylthiophenyl-1-(2H)-pyridyl)ethyl]benzamide When N-(2-bromoethyl)benzamide is treated with 4-m-methylthiophenyl-1,2,5,6-tetrahydropyridine by the procedure of Example I, the above compound is obtained.

We claim:

1. A compound selected from the group consisting of N - [3 - (3,6 - dihydro - 4 - phenyl - 1(2H) - pyridyl) propyl]benzamide and the non-toxic acid addition salts thereof.

2. A compound selected from the group consisting of N - [2 - (3,6 - dihydro - 4 - phenyl - 1(2H) - pyridyl) ethyl]benzamide and the non-toxic acid addition salts thereof.

3. A compound selected from the group consisting of N - [3 - (3,6 - dihydro - 4 - phenyl - 1(2H) - pyridyl) propyl]-p-chlorobenzamide and the non-toxic acid addition salts thereof.

4. A compound selected from the group consisting of N - [2 - (3,6 - dihydro - 4 - phenyl - 1(2H) - pyridyl) ethyl]-p-fluorobenzamide and the non-toxic acid addition salts thereof.

5. A compound selected from the group consisting of N - [2 - (4 - p - chlorophenyl - 3,6 - dihydro - 1(2H)-pyridyl)ethyl]benzamide and the non-toxic acid addition salts thereof.

6. A compound selected from the group consisting of N - [2 - (3,6 - dihydro - 4 - m - trifluoromethylphenyl-1(2H)pyridyl)ethyl]benzamide and the non-toxic acid additional salts thereof.

7. A compound selected from the group consisting of N - [2 - (3,6 - dihydro - 4 - m - trifluoromethylphenyl-1(2H)pyridyl)ethyl]-p-fluorobenzamide and the non-toxic acid addition salts thereof.

References Cited

UNITED STATES PATENTS

| | | | |
|---|---|---|---|
| 2,722,529 | 11/1955 | Fleming et al. | 260—268 |
| 2,929,818 | 3/1960 | Janssen | 260—295 |
| 3,154,557 | 10/1964 | Zenitz | 260—297 |
| 3,177,252 | 4/1965 | Thominet | 260—559 |
| 3,209,006 | 9/1965 | Wragg et al. | 260—293 |
| 3,270,026 | 8/1966 | Berger et al. | 260—295 |

HENRY R. JILES, Primary Examiner

G. T. TODD, Assistant Examiner

U.S. Cl. X.R.

260—293.4; 294, 294.7, 294.8, 309, 558, 999